US 9,444,879 B2

United States Patent
Mackie

(10) Patent No.: US 9,444,879 B2
(45) Date of Patent: *Sep. 13, 2016

(54) APPROACH FOR DOWNLOADING DATA OVER NETWORKS USING AUTOMATIC BANDWIDTH DETECTION

(71) Applicant: Apple Inc., Cupertino, CA (US)

(72) Inventor: David J. Mackie, Brookdale, CA (US)

(73) Assignee: Apple Inc., Cupertino, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 13/733,070

(22) Filed: Jan. 2, 2013

(65) Prior Publication Data

US 2013/0185388 A1 Jul. 18, 2013

Related U.S. Application Data

(63) Continuation of application No. 11/088,326, filed on Mar. 23, 2005, now Pat. No. 8,352,627.

(51) Int. Cl.
| | | |
|---|---|---|
| H04L 29/08 | (2006.01) | |
| G06F 17/30 | (2006.01) | |
| H04W 4/18 | (2009.01) | |

(52) U.S. Cl.
CPC ......... *H04L 67/10* (2013.01); *G06F 17/30905* (2013.01); *H04L 67/06* (2013.01); *H04W 4/18* (2013.01)

(58) Field of Classification Search
CPC . G06F 17/30905; H04L 67/06; H04L 67/10; H04L 29/06; H04L 67/14; H04L 67/303; H04L 69/329; H04W 4/18
See application file for complete search history.

(56) References Cited

U.S. PATENT DOCUMENTS

| | | | |
|---|---|---|---|
| 6,397,251 B1 * | 5/2002 | Graf | 709/225 |
| 6,742,023 B1 * | 5/2004 | Fanning et al. | 709/219 |
| 6,789,106 B2 * | 9/2004 | Eyer et al. | 709/205 |
| 6,990,498 B2 * | 1/2006 | Fenton et al. | |
| 7,178,161 B1 * | 2/2007 | Fristoe et al. | 725/86 |
| 7,191,215 B2 * | 3/2007 | Ganesan et al. | 709/204 |
| 7,191,244 B2 * | 3/2007 | Jennings et al. | 709/231 |
| 7,225,264 B2 * | 5/2007 | Croman et al. | 709/232 |

(Continued)

OTHER PUBLICATIONS

International Preliminary Report on Patentability and Written Opinion directed to related International Application No. PCT/US2008/002697, dated Sep. 22, 2009, 9 pages.

(Continued)

*Primary Examiner* — Ranodhi Serrao
(74) *Attorney, Agent, or Firm* — Sterne, Kessler, Goldstein & Fox PLLC

(57) ABSTRACT

An approach is provided for downloading data over a network that uses automatic bandwidth detection. According to the approach, a first version of data to be requested is selected from a plurality of available versions of the data. The first version may be selected based upon a default selection or based upon prior determined connection speeds. A client requests the first version of the data from a server and the client begins receiving the first version of the data. A determination of at least an approximate connection speed is made based upon at least a portion of the first version of the data received at the client. A determination is then made, based upon the determined connection speed, whether a different version of the data should be requested. If so, then the client requests a different version of the data from the server.

28 Claims, 3 Drawing Sheets

(56) References Cited

U.S. PATENT DOCUMENTS

| | | | |
|---|---|---|---|
| 7,356,575 B1* | 4/2008 | Shapiro | 709/220 |
| 7,376,581 B2* | 5/2008 | DeRose et al. | 705/14.73 |
| 7,383,350 B1* | 6/2008 | Moore et al. | 709/233 |
| 7,526,572 B2* | 4/2009 | Omar et al. | 709/246 |
| 8,352,627 B1 | 1/2013 | Mackie | |
| 2002/0018072 A1* | 2/2002 | Chui | H04N 1/3875 345/667 |
| 2003/0074474 A1* | 4/2003 | Roach et al. | 709/246 |
| 2003/0093507 A1* | 5/2003 | Shapiro | 709/222 |
| 2004/0010630 A1* | 1/2004 | Becher-Wickes et al. | 709/250 |
| 2004/0032882 A1* | 2/2004 | Kane | H04L 29/06 370/477 |
| 2004/0090924 A1* | 5/2004 | Giaimo et al. | 370/252 |
| 2004/0172476 A1* | 9/2004 | Chapweske | 709/231 |
| 2004/0193648 A1* | 9/2004 | Lai et al. | 707/104.1 |
| 2005/0197964 A1* | 9/2005 | Duggan | 705/57 |
| 2006/0047779 A1* | 3/2006 | Deshpande | 709/218 |

OTHER PUBLICATIONS

International Search Report directed to related International Application No. PCT/US2008/002697, mailed Jul. 8, 2008, 3 pages.

Anonymous, "HTML Timed Media Elements" [Online], dated Mar. 19, 2007, pp. 1-16.

Anonymous, "Objects, Images, and Applets", [Online], dated Dec. 24, 1999, pp. 1-15.

Niederst, J., "Web Design in a Nutshell: A Desktop Quick Reference, Second Edition" (Introduction to SMIL), Sep. 2001, pp. 450-457.

Gellens et al., "The Codecs Parameter for 'Bucket' Media Types", Nov. 1, 2005, pp. 1-13.

* cited by examiner

| PORTION SIZE (BITS) | TIME THRESHOLD (MS) | DATA RATE (BPS) | VERSION OF DATA |
|---|---|---|---|
| 5,000 | 100 | 50,000 | VERSION 1 |
| 64,000 | 200 | 320,000 | VERSION 2 |
| 500,000 | 250 | 2,000,000 | VERSION 3 |

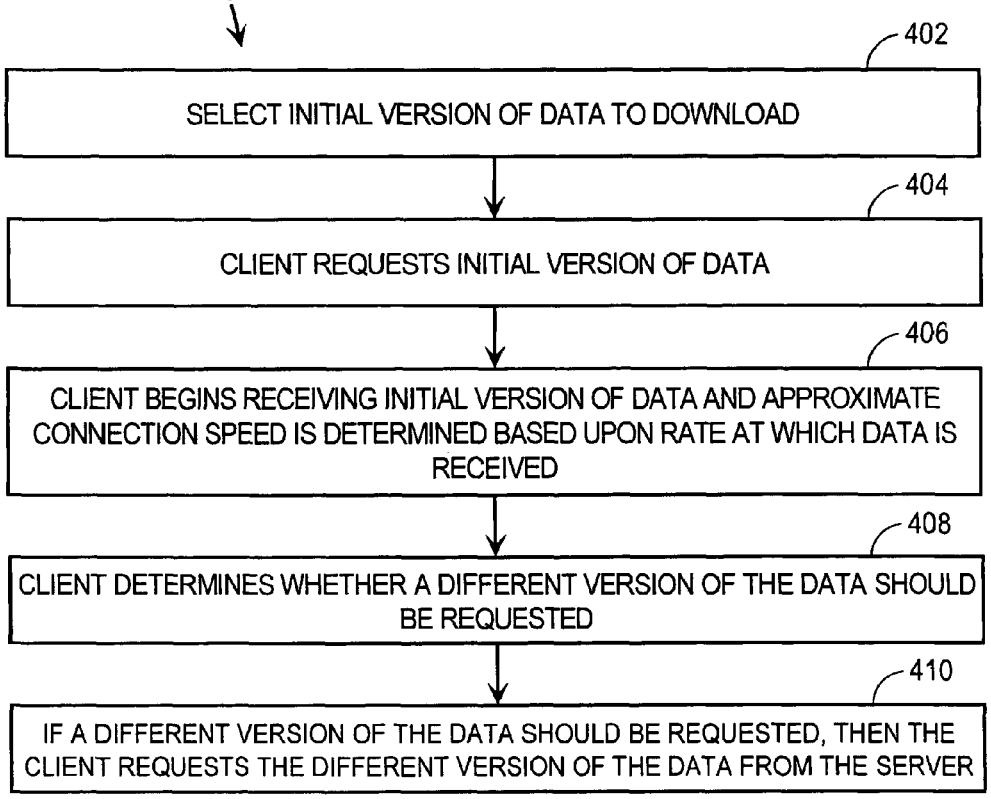

APPROACH FOR DOWNLOADING DATA OVER NETWORKS USING AUTOMATIC BANDWIDTH DETECTION

CROSS-REFERENCE TO RELATED APPLICATIONS

This application is a continuation of co-pending U.S. application Ser. No. 11/088,326 filed on Mar. 23, 2005, which is hereby incorporated by reference herein in its entirety.

FIELD OF THE INVENTION

This invention relates generally to downloading data over networks and more specifically, to an approach for downloading data over networks using automatic bandwidth detection.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

One of the issues with downloading data over communications networks is how to accommodate different users that may have very different and varying connection speeds. For example, two different users downloading the same movie over the Internet may have very different connection speeds. One user may be using a client with a dialup connection, while the other user is using a client with a "broadband" connection, such as a DSL or cable modem connection. Thus, the user with the dialup connection requires a significantly longer amount of time to download the same movie compared to the user with the broadband connection, which can result in an unsatisfactory user experience. Furthermore, the available bandwidth for any particular user is not necessarily constant and may vary significantly over time. For example, users that have shared access connections, such as cable modem services, may experience large variations in available bandwidth, depending upon the activities of the other users sharing the same connection. Thus, a user with a shared access connection may experience significantly longer download times when the shared access connection is heavily used by other users, compared to other times, when the shared access connection is not as heavily used by others. As another example, a user with a wireless connection may experience different available bandwidth as the user changes location with respect to a particular wireless access point (WAP). The user may also experience different available bandwidth when a change in location causes a change to a different WAP that has different bandwidth capabilities.

One approach to addressing this problem has been to offer a choice of different versions of content and allow a user to select a version of content that is appropriate for their connection speed. For example, low, medium and high resolution versions of a movie may be offered to a user for download. The low resolution version of the movie has the smallest file size and is suitable for slow connections, such as dialup connections. The medium resolution version of the movie has a larger file size and is suitable for medium speed connections, such as basic DSL service. The high resolution version of the movie has the largest file size and is suitable for high speed connections, such as cable modem or T1 line services. Higher resolution content generally provides a better user experience, at the cost of longer download times. Thus, the user wants to download the version that provides the highest resolution within an acceptable download delay.

One problem with this approach is that a user may not know their connection speed and may be confused by conventional connection speeds expressed in kilobits per second (kbs) or megabits per second (mbs). Even if the user knows their standard connection speed, the actual connection speed at the time of particular download may vary, depending for example, upon network traffic or the activity of other users in a shared access service, or by location for wireless devices. Furthermore, if a user selects the wrong download option, the user may have a less than optimal experience. If the user selects a lower resolution version, then the quality suffers. If the user selects a higher resolution version, then the download time may be greatly increased.

Based on the foregoing, there is a need for an approach for downloading data over networks that does not suffer from limitations of prior approaches.

BRIEF DESCRIPTION OF THE DRAWINGS

In the figures of the accompanying drawings like reference numerals refer to similar elements.

FIG. 3 depicts a table that may be used to determine an approximate current connection speed based upon an amount of data received in a specified time.

FIG. 4 is a flow diagram that depicts an operational example of the approach described herein for downloading data using automatic bandwidth detection.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. SELECTING AN INITIAL VERSION OF DATA TO BE REQUESTED
IV. DETERMINING THE CURRENT CONNECTION SPEED BASED UPON THE TIME TO RECEIVE SUCCESSIVELY LARGER PORTIONS OF DATA

V. DETERMINING THE CURRENT CONNECTION SPEED BASED UPON THE AMOUNT OF DATA RECEIVED WITHIN A SPECIFIED TIME
VI. DETERMINING WHETHER A DIFFERENT VERSION OF DATA SHOULD BE REQUESTED
VII. OPERATIONAL EXAMPLE
VIII. STREAMING DATA APPLICATIONS
IX. IMPLEMENTATION MECHANISMS

I. Overview

An approach is provided for downloading data over a network that uses automatic bandwidth detection. According to the approach, a first version of data to be requested is selected from a plurality of available versions of the data. The first version may be selected based upon a default selection or based upon prior determined connection speeds. A client requests the first version of the data from a server and the client begins receiving the first version of the data. A determination of at least an approximate connection speed is made based upon a rate at which at least a portion of the first version of the data is received at the client. A determination is then made, based upon the determined connection speed, whether a different version of the data should be requested. If so, then the client requests a different version of the data from the server. As described in more detail hereinafter, connection speed may be determined by measuring the amount of time required to receive successively larger portions of the first version of the data or by measuring the amount of the first version of the data received within a specified measuring period.

II. Architecture

Figures 1, 2:
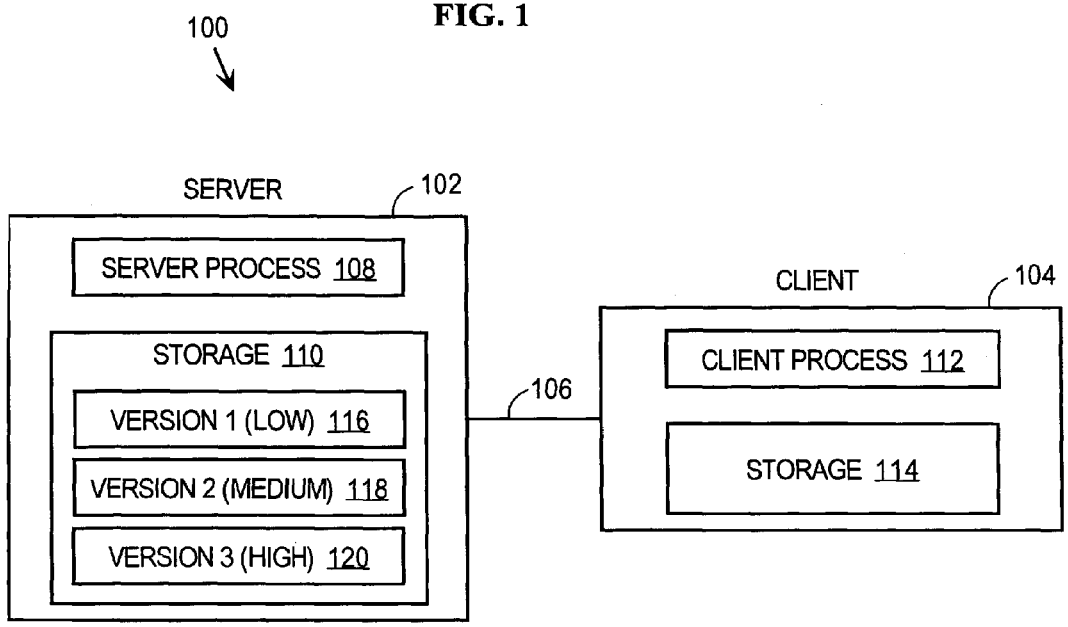
FIG. 1 is a block diagram that depicts an architecture for implementing an approach for downloading data over a communications network according to an embodiment of the invention.
FIG. 2 is a block diagram that depicts a table of data used to determine the connection speed between server and client by measuring the times required to receive successively larger portions of data until the measured time to receive a particular portion of data exceeds a time threshold specified for the particular portion of data.

FIG. 1 is a block diagram of an arrangement 100 for downloading data over a communications network using automatic bandwidth detection according to an embodiment of the invention. Arrangement 100 includes a server 102 and a client 104 communicatively coupled via a communications link 106. Communications link 106 may be implemented by any medium or mechanism that provides for the exchange of data between server 102 and client 104. Examples of communications link 106 include, without limitation, a network such as a Local Area Network (LAN), Wide Area Network (WAN), Ethernet or the Internet, or one or more terrestrial, satellite or wireless links. Communications link 106 may be secure or unsecured and may use any protocol. For example, in the context of the Internet, communications may be made on communications link 106 using HTTP or HTTPS.

Server 102 is a device configured to provide information to other entities in response to requests from those entities. Server 102 includes a server process 108 that may be implemented by any process capable of processing requests for information from client 104 and providing the requested information to client 104. For example, in the context of the Internet, server process 108 may be a Web server, such as an Apache server, that processes requests for Web pages from client 104 and provide the requested Web pages to client 104. Server 102 is also configured with storage 110 that may be implemented by any type or combination of volatile, e.g., random access memory (RAM), and non-volatile storage, e.g., one or more disks. Server 102 may include various other elements and processes, depending upon a particular implementation, that are not depicted in FIG. 1 or described herein for purposes of explanation.

Client 104 is a device configured to request data from server 102. Client 104 includes a client process 112 that may be implemented by any process capable of generating and sending requests for information to server 102. For example, in the context of the Internet, client process 112 may be a generic Web browser or a media player process, configured to download and play video data and music. Client 104 may include various other elements and processes, depending upon a particular implementation, that are not depicted in FIG. 1 or described herein for purposes of explanation. For example, client 104 may include a graphical user interface (GUI) for conveying information to a user. Client 104 may also include user selection devices, such as a mouse, and interfaces to allow a user to convey selection information to client process 112. Client 104 also includes storage 114 that, like storage 110, may be implemented by any type or combination of volatile, e.g., random access memory (RAM), and non-volatile storage, e.g., one or more disks. Client 104 may be any type of device or mechanism and the approach described herein is not applicable to any type of device or context. Examples of client 104 include, without limitation, workstations, personal computers (desktop or laptop), cellphones, personal digital assistants (PDAs), media players and any other wireless or mobile devices that are capable of requesting data from server 102.

According to one embodiment of the invention, storage 110 includes three versions 116, 118, 120 of data, identified in FIG. 1 as "VERSION 1", "VERSION 2" and "VERSION 3." As depicted in FIG. 1, the three versions of the data correspond to low, medium and high resolution versions of the data. Accordingly, VERSION 1 116 contains relatively less data than VERSION 2 118, which contains relatively less data than VERSION 3 120. The actual amount of data in the three versions 116, 118, 120 is not important. As described in more detail hereinafter, the particular version 116, 118, 120 of the data requested by client 104 is automatically selected based upon the determined connection speed between server 102 and client 104 via communications link 106.

III. Selecting an Initial Version of Data to be Requested

According to the approach, a first version of data to be requested is automatically selected from a plurality of available versions of the data. The first version may be a default version for a particular client 104, or a general default used for multiple clients. For example, when client process 112 is first installed on client 104, a default first version may be established.

According to one embodiment of the invention, prior determined connection speeds are used to select an initial version of data to request. When connection speeds are determined as described hereinafter, the connection speeds are stored in association with client 104 so that they may be used in future initial version selection determinations. For example, suppose that a current connection speed between client 104 and server 102 is determined during the download of data from server 102 to client 104, as described hereinafter. The current connection speed is stored in storage 114 in association with client 104. Sometime later, client process 112 is ready to download other data from server 102. Client process 112 retrieves and uses the prior connection speed to select an initial version of data to request. For example, suppose that the prior connection speed was 50,000 bps. Client process 112 selects an initial version of data that corresponds to the connection speed of 50,000 bps, e.g., a version that corresponds to a dialup connection speed.

Connection speeds may be stored in association with a client by network address. For example, a current connection speed determined for client 104 may be stored in storage 114 based upon the IP address of client 104. In this situation, client process 112 performs a lookup of the prior connection speed based upon the IP address of client 104. Some clients are configured with more than one network interface. For example, a laptop computer may be configured with both a wired network interface, such as Ethernet card, and a wireless network interface, such as an 802.11 interface card. Different network interfaces may provide different connection speeds. Therefore, according to on embodiment of the invention, current connection speeds are stored in association with a client based upon both data that identifies the client and by network interface. Thus, multiple current connection speeds may be stored for a client, depending upon how many network interfaces the client has. When an initial selection of a version is to be made, a prior connection speed is retrieved based upon the client and the particular network interface being used.

It is not uncommon for content to be made available across several servers to increase the availability of the content. For example, a song or movie may be made available to customers via several servers. Requests for the song or movie are routed to a particular server, for example, based upon the current load of each server. Each connection between a client and a particular server may have a different connection speed, based upon a number of factors, such as the capacity and demand at each server. According to one embodiment of the invention, connection speeds are stored based upon particular connections. For example, the current connection speed for client 104 may be stored in association with a connection between client 104 and "Server1.XYZ.com" or a connection between client 104 and "Server2.XYZ.com".

According to another embodiment of the invention, the selection of an initial version of data may be made based upon connection speeds for similar connections. Thus, although a prior connection speed may not be available for a specific connection, a prior connection speed may be available for a similar connection and used to select an initial version of data. For example, suppose that a request for content (foo.jpg) is to be made and several versions of foo.jpg are available. The request might take the form of: "http://www.server1.xyz.com/videos/foo1.jpg". Suppose further that there is no stored connection speed for the connection between client 104 and server1 at xyz.com, but that a prior connection speed was stored and is available for the connection between client 104 and server2 at xyz.com. In this situation, the prior connection speed for server2 at xyz.com may be used to select the initial version of foo.jpg to be requested. Prior connection speed information may be shared among multiple clients, for example, in a connection speed library. This may be useful in situations where multiple clients have similar access to a server, for example, in an office environment where several clients shared a wireless access point (WAP) and a server.

IV. Determining the Current Connection Speed Based Upon the Time to Receive Successively Larger Portions of Data According to one embodiment of the invention, the current connection speed between server 102 and client 104 is determined by measuring the times required to receive successively larger portions of data, until the measured time to receive a particular portion of data exceeds a time threshold specified for the particular portion of data. A data rate associated with the particular portion of data provides at least an approximation of the current connection speed.

This approach is now described in more detail with reference to a table 200 depicted in FIG. 2. Each row in Table 200 corresponds to a successively larger portion of data and includes a portion size (in bits), a time threshold (in ms) and a data rate (in bps). Thus, a 5,000 bit portion of data received in 100 ms corresponds to a data rate of 50,000 bits per second.

The portion sizes and time thresholds in table 200 are used to determine an approximate current connection speed between server 102 and client 104. Client 104 requests a version of data from server 102. The amount of time required for client 104 to receive 5,000 bits of the requested data from server 102 is measured. The measurement may be made from the time client 104 requests the data from server 102. Alternatively, the measurement may be made from the time that client 104 starts receiving data to be measured. The latter approach may provide a more meaningful measurement because it eliminates delays attributable to server 102. The 5,000 bits may, or may not be, the first 5,000 bits received by client 104 from server 102 in the requested version of data, depending upon a particular implementation. If the measured time to receive 5,000 bits is equal to or greater than 100 ms, then the current connection speed is 50,000 bps or slower and no further testing is performed.

If the measured time to receive 5,000 bits is less than 100 ms, then the current connection speed is greater than 50,000 bps and additional testing is performed. In this situation, the amount of time required for client 104 to receive 64,000 bits of data from server 102 is measured. The 64,000 bits of data may, or may not be, the next 64,000 bits after the 5,000 bits previously measured, depending upon a particular implementation. If the measured time to receive the 64,000 bits is equal to or greater than 200 ms, then the current connection speed is greater than 50,000 bps, but equal to or less than 320,000 bps, and no further testing is performed.

If the measured time to receive the 64,000 bits is less than 200 ms, then the current connection speed is greater than 320,000 bps and additional testing is performed. In this situation, the amount of time required for client 104 to receive 500,000 bits of data from server 102 is measured. The 500,000 bits of data may, or may not be, the next 500,000 bits after the 64,000 bits previously measured, depending upon a particular implementation. If the measured time to receive the 500,000 bits is equal to or greater than 250 ms, then the current connection speed is greater than 320,000 bps, but equal to or less than 2,000,000 bps. If the measured time to receive 500,000 bits is less than 250 ms, then the current connection speed is greater than 2,000,000 bps.

The use of a test ladder as described herein allows the current connection speed to be at least approximated by measuring the times required to receive successively larger portions of data and comparing the measured times to time thresholds associated with each portion of data. In the present example, a test ladder with three levels has been used for purposes of explanation. The approach is not limited to the use of three levels and any number of levels may be used. Increasing the number of levels in the test ladder provides greater granularity in the estimate of the current connection speed. It should be noted that the use of a test ladder in the manner described herein avoids having to perform a calculation to determine an estimated data rate. Instead, simple comparisons and lookups may be used.

According to one embodiment of the invention, a maximum limit (latency ceiling) is placed on measured times to control the overall time of the process. For example, a maximum limit may be set at one to two seconds. Once a measurement reaches the maximum limit, the measurement is stopped and the maximum limit value is used. Alternatively, once the maximum limit is reached, the process may be aborted and a default version selection used. The use of a maximum limit provides control over the adverse effects that can be caused by an exceptionally slow connection.

One of the benefits of this approach is that the use of progressively larger portions of data via the test ladder accommodates both low and high speed connections. Low speed connections are not overloaded with large amounts of test data, which reduces the adverse effects that the testing might have. Higher speed connections will automatically use larger portions of data as the test ladder is traversed, which provides more accurate measurements.

V. Determining the Current Connection Speed Based Upon the Amount of Data Received within a Specified Time According to another embodiment of the invention, the current connection speed between client 104 and server 102 is determined based upon a measured amount of data received by client 104 within a specified time, i.e., a measuring period. The measuring period may start at different times, depending upon a particular implementation, and the approach is not limited to the measuring period starting at any particular time. For example, the measuring period may start when client 104 requests a version 116, 118, 120 of the data. As another example, to eliminate latencies associated with server 102, which may be highly variable, the measuring period may start when client 104 receives the first data contained in a requested version 116, 118, 120 of the data. As another example, the measuring period may start after any portion of a requested version 116, 118, 120 of the data has been received, so long as the requested version 116, 118, 120 of data is not completely received before the measuring period is complete. The length of the measuring period may be specified via client process 112, or any other process and may vary, depending upon the requirements of a particular implementation. For example, the measuring period may be specified by configuration data used by client process 112. The measuring period should be selected so that the end of the measuring period occurs before all of the data in the requested version 116, 118, 120 of data has been received.

Once the amount of data received during the measuring period has been counted, the current connection speed may be determined by two approaches. According to the first approach, the current connection speed is obtained by dividing the amount of data received by the measuring period. This approach provides a relatively accurate determination of the current connection speed. According to the second approach, a simple lookup is performed to determine an approximate current connection speed. FIG. 3 depicts a table 300 that may be used with the second approach. Table 300 indicates the data rate, in bps, for three different amounts of received data, in bits, during a measuring period of 0.5 seconds. Given a number of bits of data receiving during the measuring period, table 300 may be traversed to obtain the closest data rate. For example, for up to 25,000 bits, the data rate of 50,000 bps is used. For between 25,000 and 160,000 bits, the data rate of 320,000 bps is used. For more than 160,000 bits, the data rate of 2,000,000 bps is used. This lookup approach avoids having to perform the calculation of the first approach, albeit with the consequence of a less accurate current connection speed.

VI. Determining Whether a Different Version of Data should be Requested

Once the current connection speed has been determined, a determination is made whether a different version of data should be requested. This generally involves identifying a version of data that best corresponds to the current connection speed, and then determining whether this is the version of data currently being received. If they are different, then the version of data that best corresponds to the current connection speed is requested.

For example, table 200 identifies three versions 116, 118, 120 of data that best correspond to each of the three connection speeds. Thus, if using the test ladder as previously described herein, a determination is made that the current connection speed is 50,000 bps or less, then VERSION 1 is the version of data that best corresponds to the current connection speed. If the current connection speed is greater than 50,000 bps but less than 320,000 bps, then VERSION 2 is the version of data that best corresponds to the current connection speed. If the current connection speed is greater than 320,000 bps, then VERSION 3 is the version of data that best corresponds to the current connection speed. A similar approach may be used with table 300 when the current connection speed is determined by measuring the amount of data received by client 104 during a specified time.

Once the version of data that best corresponds to the current connection speed has been identified, this version is compared to the version currently being received to determine whether a different version should be requested. If the two versions are the same, then a different version does not need to be requested. If they are different, then the version that best corresponds to the current connection speed is requested. For example, suppose that client 104 initially requested and is currently receiving VERSION 1 of the data from server 102. Suppose further that the current connection speed is determined to be 320,000 bps. In this situation, VERSION 2 of the data is the version that best corresponds to the current connection speed. Since VERSION 2 is not currently being received, client 104 requests VERSION 2 of the data from server 102.

It should be noted that although in this example a higher resolution version was requested, in some situations the selection process may result in a lower resolution version being selected. This may occur, for example, if a default selection was not appropriate for a current connection speed. As another example, the current connection speed may be different than a prior connection speed on which the initial version selection was made.

VII. Operational Example

FIG. 4 is a flow diagram 400 that depicts and operation example of the approach described herein for downloading data using automatic bandwidth detection. In step 400, an initial version of data is selected. For example, suppose that an initial selection is made for VERSION 1 of data based upon client 104 historically receiving data from server 102 over communications link 106 at dial up connection speeds.

In step 404, client requests VERSION 1 of the data from server 102. In step 406, client 104 begins receiving VERSION 1 of the data and determines at least an approximate current connection speed based upon the rate at which at least a portion of VERSION 1 of the data is received. For example, suppose that communications link 106 has been changed to a cable modem connection. Using the approaches described herein, a determination is made that the current connection speed is now greater than 2,000,000 bps. The current connection speed may be stored in storage 114 for use in future initial selection determinations as described herein.

In step 408, client 104 determines whether a different version of the data is to be requested. VERSION 3 of the data is selected as the best version that corresponds to the current connection speed of 2,000,000 bps. The selected version is compared to the current version to determine whether a different version should be requested. In the present example, since the selected version of data VERSION 3 is different than the current version of data VERSION 1, a determination is made that a different version of data, i.e., VERSION 3, should be requested. In step 410, client 104 requests VERSION 3 from server 102.

VIII. Streaming Data Applications

In conventional client/server arrangements, a server provides all of the requested data to a client as quickly as possible, given loading and bandwidth constraints. For example, in the context of the Internet, an HTTP server typically transfers the entire contents of a file that corresponds to the URL requested by the client in the HTTP GET request. In streaming data applications, data is provided by a server to a client according to a specified streaming rate. The specified streaming rate is typically based upon the natural rate of the media. Thus, for streaming data applications, a measurement of the rate at which data is received at a client is not necessarily indicative of the connection speed between the client and a server, because the data is intentionally being transmitted at a slower rate.

Therefore, according to one embodiment of the invention, for streaming data applications, the approaches described herein are used during setup negotiation before the actual streaming of data begins. Most streaming data protocols provide an extension mechanism that can be used for this purpose. For example, the Real Time Streaming Protocol (RTSP) provides and OPTIONS request that can be used by a client to request an amount of pseudo-random data to be returned in the OPTIONS response message. This option can be used to conduct the test ladder of bandwidth tests with successive OPTIONS requests on an RTSP connection. Alternatively, instead of using an extension mechanism, a set of test files may be created and iteratively requested to test the connection speed.

IX. Implementation Mechanisms

The approach described herein for downloading data provides for an improved user experience by automatically selecting a version of data to download based upon the current connection speed. This allows the user to enjoy the highest resolution version given their current connection speed without having to be involved in the process. Furthermore, the approach may be implemented transparent to users. For example, the approach may be implemented in a media player in a manner such that the user is not aware that the media player selected a particular version of data, e.g., a movie or video, based upon automatic bandwidth detection as described herein. The approach may be a configurable option in a media player. The approach allows a version selection to be made quickly so that delays attributable to requesting a different version of the same data are not noticed by a user. For example, the portion sizes in the test ladder may be made small and the measuring period made short so that the determination of whether a different version of data should be requested can be made quickly. This allows the version of data to be optimized for the current connection speed with minimal adverse impact on the user experience.

The approach may be implemented on a request-by-request basis, or less frequently, depending upon the particular implementation. For example, once the approach has been implemented, the estimated connection speed may be re-used to select versions of data for other requests using the same or similar connections, as described herein. The estimated connection speed may be re-determined after a specified number of requests, after a specified amount of time, or based upon other criteria. Re-determining the estimated connection speed is useful for mobile devices that experience varying connection speeds.

Although the approach has been depicted in the figures and described herein in the context of downloading data from server 102 to client 104, the invention is not limited to this context and is applicable to exchanging data between any two entities of any type.

Figure 5:
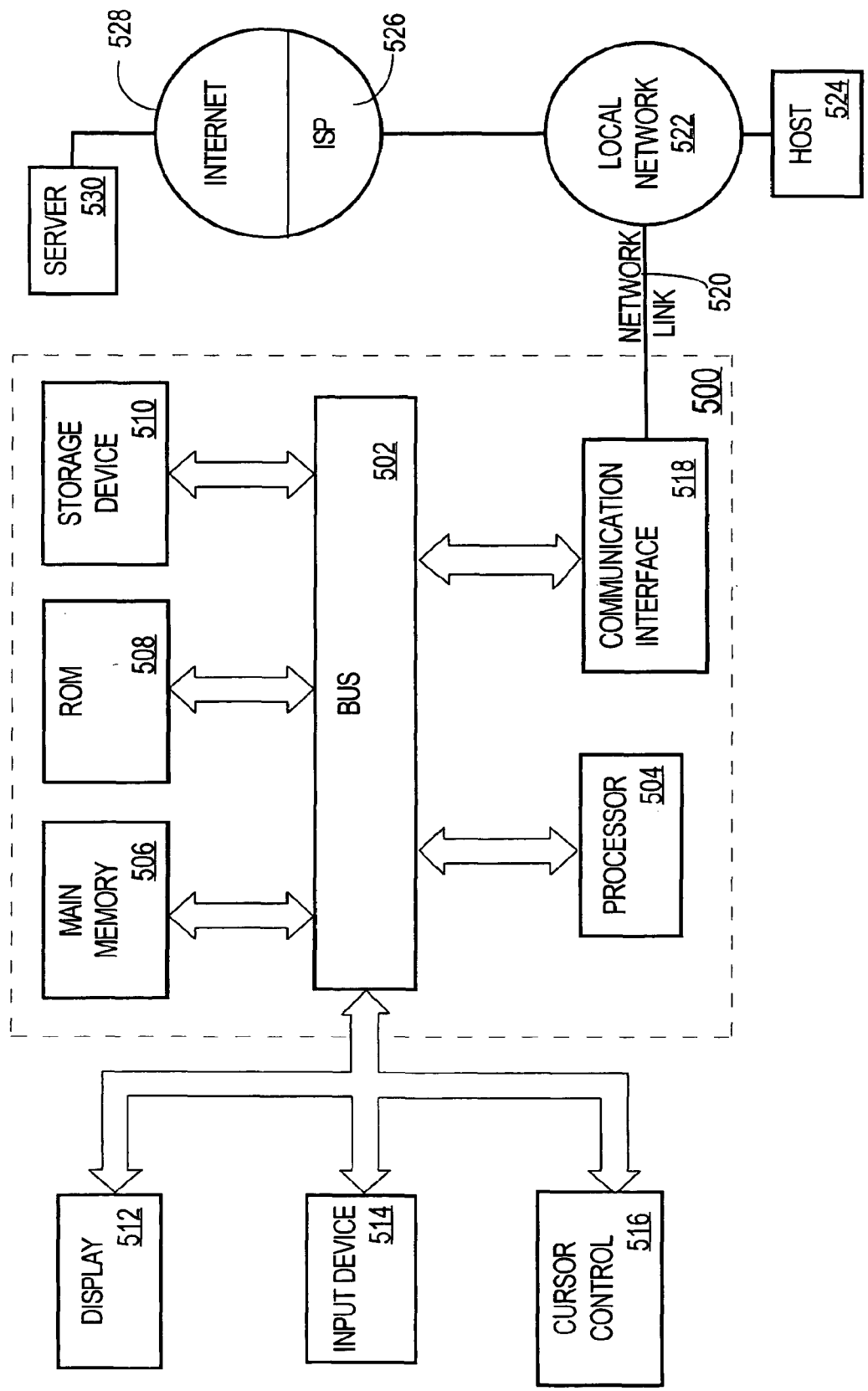
FIG. 5 is a block diagram of an example computer system on which embodiments of the invention may be implemented.

Embodiments of the invention may be implemented in any process, mechanism or computer architecture and the approach is not limited to any particular implementation or context. For purposes of example, FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for downloading data over a communications link, the computer-implemented method comprising:
   requesting, from a server, a first version of the data from a plurality of versions of the data;
   measuring a first amount of time to receive a first portion of the first version of the data;
   measuring a second amount of time to receive a second portion of the first version of the data based at least in part on the first amount of time being less than a first time threshold, wherein the second portion is greater in size than the first portion;
   calculating a connection speed associated with a network address based at least in part on the second amount of time;
   storing, at a client, the calculated connection speed; and
   selecting a version of the data from the plurality of versions of the data based at least in part on the connection speed.

2. The computer-implemented method as recited in claim 1, further comprising:
   selecting the first version of the data from the plurality of versions of the data based at least in part on a prior connection speed to the server.

3. The computer-implemented method as recited in claim 1, further comprising:
   selecting the first version of the data from the plurality of versions of the data based at least in part on a prior connection speed.

4. The computer-implemented method as recited in claim 1, further comprising:
   generating connection speed data based at least in part on the connection speed wherein the connection speed data is also associated with a network interface of the client.

5. The computer-implemented method as recited in claim 1, further comprising:
requesting the selected version of the data from the server based at least in part on the selected version of data being different than the first version of the data.

6. The computer-implemented method as recited in claim 1, wherein the measuring the second amount of time comprises:
comparing the first amount of time to the first time threshold.

7. The computer-implemented method as recited in claim 1, wherein the calculating the connection speed comprises:
comparing the second amount of time to a second time threshold.

8. The computer-implemented method as recited in claim 1, further comprising:
terminating the measuring the first amount of time based at least in part on the first amount of time exceeding the first time threshold; and
setting the first amount of time to the first time threshold.

9. The computer-implemented method as recited in claim 1, wherein the measuring the first amount of time comprises beginning measurement of the first amount of time at receipt at the client of the first version of the data from the server.

10. The computer-implemented method as recited in claim 1, wherein the first version of the data and the selected version of the data are versions of a same original data, the first version of the data having at least one property that is different than the selected version of the data.

11. The computer-implemented method as recited in claim 10, wherein the at least one property comprises a resolution of the data.

12. The computer-implemented method as recited in claim 10, wherein the at least one property comprises an amount of data.

13. The computer-implemented method as recited in claim 10, wherein the at least one property comprises a bandwidth used for transmitting data from the server.

14. The computer-implemented method as recited in claim 1, further comprising:
measuring a third amount of time to receive a third portion of the first version of the data based at least in part on the second amount of time being less than a second time threshold, wherein the third portion is greater in size than the second portion, and the measuring the third amount of time is performed after the measuring the second amount of time; and
calculating the connection speed based at least on the third amount of time.

15. An apparatus for downloading and viewing data over the Internet comprising:
a computer system comprising a processor and a memory, the computer system:
requesting, from a server, a first version of data from a plurality of versions of the data;
in response to measuring a first amount of time and a second amount of time, calculating a connection speed associated with a network address based at least in part on the second amount of time, wherein the first amount of time is based at least in part on receipt of a first portion of the first version of the data, and the second amount of time is based at least in part on receipt of a second portion of the first version of the data and the first amount of time being less than a first time threshold, wherein the second portion is greater in size than the first portion; and
storing, at the computer system, the calculated connection speed; and
selecting a version of the data from the plurality of versions of the data based at least in part on the connection speed.

16. The apparatus as recited in claim 15, the computer system:
measuring a third amount of time to receive a third portion of the first version of the data based at least in part on the second amount of time being less than a second time threshold, wherein the third portion is greater in size than the second portion, and the measure the third amount of time is performed after the measure the second amount of time; and
calculating the connection speed based at least on the third amount of time.

17. A computer-implemented method for downloading data over a communications link, the computer-implemented method comprising:
determining a first connection speed to a server during a setup negotiation with the server;
selecting a first version of the data from a plurality of versions of the data based at least in part on the first connection speed;
measuring a first amount of time to receive a first portion of the first version of the data;
measuring a second amount of time to receive a second portion of the first version of the data based at least in part on the first amount of time being less than a first time threshold, wherein the second portion is greater in size than the first portion;
calculating a second connection speed associated with a network address based at least in part on the second amount of time;
storing, at a client, the calculated second connection speed;
selecting a version of the data from the plurality of versions of the data based at least in part on the second connection speed; and
requesting the selected version of the data from the server.

18. A non-transitory computer-readable medium for downloading data over a communications link, the computer-readable medium carrying instructions which, when executed by one or more processors, cause:
requesting, from a server, a first version of the data from a plurality of versions of the data;
measuring a first amount of time to receive a first portion of the first version of the data;
measuring a second amount of time to receive a second portion of the first version of the data based at least in part on the first amount of time being less than a first time threshold, wherein the second portion is greater in size than the first portion;
calculating a connection speed associated with a network address based at least in part on the second amount of time;
storing, at a client, the calculated connection speed;
selecting a version of the data from the plurality of versions of the data based at least in part on the connection speed; and
requesting the selected version of the data from the server.

19. The computer-readable medium as recited in claim 18, further comprising additional instructions which, when executed by the one or more processors, cause selecting the first version of the data from the plurality of versions of the data based at least in part on a prior connection speed to the server.

20. The computer-readable medium as recited in claim 18, further comprising additional instructions which, when executed by the one or more processors, cause selecting the first version of the data from the plurality of versions of the data based at least in part on a prior connection speed.

21. The computer-readable medium as recited in claim 18, further comprising additional instructions which, when executed by the one or more processors, cause:
    generating connection speed data based at least in part on the connection speed wherein
    the connection speed data is also associated with a network interface of the client.

22. The computer-readable medium as recited in claim 18, further comprising additional instructions which, when executed by the one or more processors, cause:
    requesting the selected version of the data from the server based at least in part on the selected version of data being different than the first version of the data.

23. The computer-readable medium as recited in claim 18, wherein the measuring the second amount of time comprises:
    comparing the first amount of time to the first time threshold.

24. The computer-readable medium as recited in claim 18, wherein the calculating the connection speed comprises:
    comparing the second amount of time to a second time threshold.

25. The computer-readable medium as recited in claim 18, further comprising additional instructions which, when executed by the one or more processors, cause:
    terminating the measuring the first amount of time based at least in part on the first amount of time exceeding the first time threshold; and
    setting the first amount of time to the first time threshold.

26. The computer-readable medium as recited in claim 18, wherein the measuring the first amount of time comprises beginning measurement of the first amount of time at receipt at the client of first data contained in the first portion of the first version of the data from the server.

27. The computer-readable medium as recited in claim 18, further comprising additional instructions which, when executed by the one or more processors, cause:
    measuring a third amount of time to receive a third portion of the first version of the data based at least in part on the second amount of time being less than a second time threshold, wherein the third portion is greater in size than the second portion, and the measuring the third amount of time is performed after the measuring the second amount of time; and
    calculating the connection speed based at least on the third amount of time.

28. A non-transitory computer-readable medium for downloading data over a communications link, the computer-readable medium carrying instructions which, when executed by one or more processors, cause:
    determining a first connection speed to a server during a setup negotiation with the server;
    selecting a first version of the data from a plurality of versions of the data based at least in part on the first connection speed;
    in response to measuring a first amount of time and a second amount of time, calculating a second connection speed associated with a network address based at least in part on the second amount of time, wherein the first amount of time is based at least in part on receipt of a first portion of the first version of the data, and the second amount of time is based at least in part on receipt of a second portion of the first version of the data and the first amount of time being less than a first time threshold, wherein the second portion is greater in size than the first portion; and
    storing, at a client, the calculated second connection speed;
    selecting a version of the data from the plurality of versions of the data based at least in part on the second connection speed; and
    requesting the selected version of the data from the server.

* * * * *